US009833970B2

(12) United States Patent
Brewer

(10) Patent No.: US 9,833,970 B2
(45) Date of Patent: Dec. 5, 2017

(54) MULTI-LAYER MARINE VESSEL FLOOR MAT

(71) Applicant: James Brewer, Cumberland City, TN (US)

(72) Inventor: James Brewer, Cumberland City, TN (US)

( * ) Notice: Subject to any disclaimer, the term of this patent is extended or adjusted under 35 U.S.C. 154(b) by 89 days.

(21) Appl. No.: 14/618,877

(22) Filed: Feb. 10, 2015

(65) Prior Publication Data
US 2016/0229491 A1  Aug. 11, 2016

(51) Int. Cl.
| | | |
|---|---|---|
| B63B 3/48 | (2006.01) |
| B32B 5/18 | (2006.01) |
| B32B 3/04 | (2006.01) |
| B32B 3/08 | (2006.01) |
| B32B 3/26 | (2006.01) |

(52) U.S. Cl.
CPC ............. *B32B 5/18* (2013.01); *B32B 3/04* (2013.01); *B32B 3/08* (2013.01); *B32B 3/266* (2013.01); *B32B 3/263* (2013.01); *B32B 2250/02* (2013.01); *B32B 2266/0207* (2013.01); *B32B 2307/56* (2013.01); *B32B 2307/744* (2013.01); *B32B 2471/04* (2013.01); *B32B 2605/12* (2013.01)

(58) Field of Classification Search
CPC ......................................... B63B 3/48
USPC .......................................... 428/100
See application file for complete search history.

(56) References Cited

U.S. PATENT DOCUMENTS

| | | | |
|---|---|---|---|
| 4,361,614 A | 11/1982 | Moffitt | |
| 4,403,009 A | 9/1983 | Onderak et al. | |
| 4,925,724 A | 5/1990 | Ogden | |
| 5,787,655 A | 8/1998 | Saylor | |
| 8,298,644 B2 | 10/2012 | Booth | |
| 8,728,581 B2 | 5/2014 | Fowler | |
| 2003/0219570 A1* | 11/2003 | Kanter | A47G 27/0293 428/157 |
| 2004/0121117 A1 | 6/2004 | Peterson | |
| 2013/0233228 A1 | 9/2013 | Bartlett | |

* cited by examiner

*Primary Examiner* — Brent O'Hern
(74) *Attorney, Agent, or Firm* — The Keys Law Firm PLLC

(57) ABSTRACT

A marine vessel floor mat for attachment to the deck of a boat to provide enhanced cushioning to stand on. In one embodiment, the marine vessel floor mat comprises a cushion layer shaped to fit the dimensions of the bow of a conventional marine vessel or other target section of such a marine vessel with a non-slip layer shaped as the cushion layer, or with an additional front section, and/or additional rear section permanently attached to the top surface of the cushion layer. The cushion layer additionally includes a tapered edge on its top surface and a plurality of fastener strips for enabling removable attachment to the surface of the boat deck on its bottom surface.

6 Claims, 2 Drawing Sheets

MULTI-LAYER MARINE VESSEL FLOOR MAT

BACKGROUND OF THE INVENTION

Field of the Invention

This invention relates generally to marine accessories and, more particularly, to a multi-layered floor mat with an intended use of placement on the deck of a boat that enhances comfort.

Description of the Prior Art

It is well known that many outdoor enthusiasts experience significant levels of fatigue when standing for prolonged periods while fishing from the deck of a boat. The deck of a boat generally provides very little built in cushion to enhance a user's comfort. Thus, there remains a need for a marine vessel floor mat which could be deployed on the deck of a boat to provide a more comfortable place to stand. It would be helpful if such a marine vessel floor mat includes a plurality of levels so as to offer cushioned support in addition to non-slip surfacing. It would be additionally desirable for such a marine vessel floor mat to be attachable to the deck of a boat through a removable fastening system.

The Applicant's invention described herein provides for a marine vessel floor mat adapted to provide a cushioned area on the deck of a boat for a user to stand on while fishing. The primary components in Applicant's marine vessel floor mat are a cushion layer having a deck fastening surface and a non-slip layer. When in operation, the marine vessel floor mat enables a user to stand for much longer periods of time on the deck of a boat by providing enhanced comfort. As a result, many of the limitations imposed by prior art structures are removed.

SUMMARY OF THE INVENTION

A marine vessel floor mat for attachment to the deck of a boat to provide enhanced cushioning to stand on. In one embodiment, the marine vessel floor mat comprises a cushion layer shaped to fit the dimensions of the bow of a conventional marine vessel or other target section of such a marine vessel with a non-slip layer shaped as the cushion layer, or with an additional front section, and/or additional rear section permanently attached to the top surface of the cushion layer. The cushion layer additionally includes a tapered edge on its top surface and a plurality of fastener strips for enabling removable attachment to the surface of the boat deck on its bottom surface.

It is understood that the cushion layer provides a cushion means for enhancing comfort and each fastener strip provides an attachment means for securing to the surface of a boat deck. The non-slip layer provides an optional grip means for enhancing stability.

It is an object of this invention to provide a marine vessel floor mat which could be deployed on the deck of a boat to provide a more comfortable place to stand.

It is another object of this invention to provide a marine vessel floor mat that includes a plurality of levels so as to offer cushioned support in addition to non-slip surfacing.

It is yet another object of this invention to provide a marine vessel floor mat that is attachable to the deck of a boat through a removable fastening system.

These and other objects will be apparent to one of skill in the art.

DETAILED DESCRIPTION OF THE INVENTION

Figure 1:
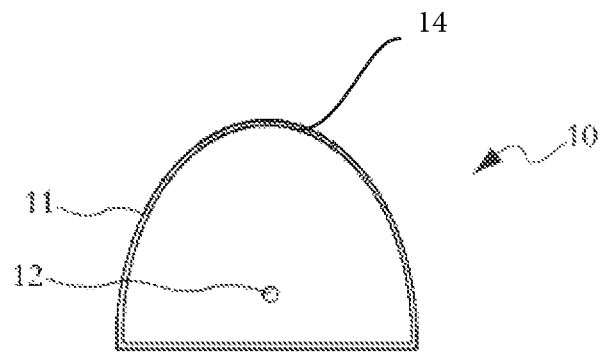
FIG. 1 is a top plan view of the cushion layer of a marine vessel floor mat built in accordance with the present invention.
Figure 2:
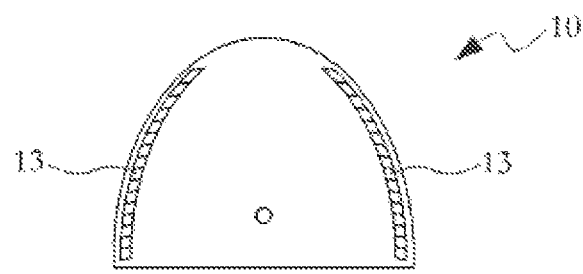
FIG. 2 is a bottom plan view of the cushion layer of a marine vessel floor mat built in accordance with the present invention.
Figure 3:
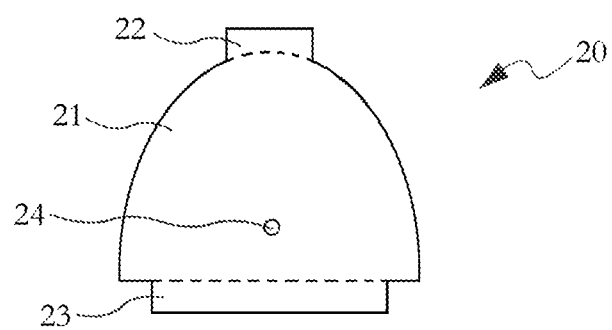
FIG. 3 is a top plan view of the non-slip layer of a marine vessel floor mat built in accordance with the present invention.
Figure 4:
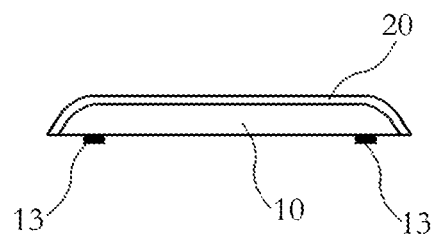
FIG. 4 is a side elevational view of a cross section of a marine vessel floor mat built in accordance with the present invention.

Referring now to the drawings and in particular FIGS. 1 and 2, a marine vessel floor mat includes a cushion layer 10 that in the preferred embodiment is shaped to fit the dimensions of the bow of a conventional marine vessel or other target section of such a marine vessel. In this regard, the perimeter of the cushion layer 10 includes in the preferred embodiment an arcuate segment 14. The cushion layer 10 defines a ⅜ inch think neoprene foam body in the preferred embodiment. It is contemplated that in alternate embodiments, the cushion layer may include other cushioning material in addition to or alternative to the neoprene.

The cushion layer 10 includes on its top surface a tapered edge 11 that extends around the entire perimeter of the cushion layer 10 and lessens any level transition between marine vessel floor mat and the surface on which it is placed. The cushion layer 10 additionally includes a pedal seat cushion aperture 12 therein that enables the placement of a conventional pedal seat pole (not shown) or other support structure through the body of the cushion layer 10 to the surface on which it is placed.

On its bottom surface, the cushion layer 10 includes two hook and loop fastener strips 13 permanently adhered thereto. In the preferred embodiment, the fastener strips 13 defines the hook component of a hook and loop fastener, thereby enabling the cushion layer 10 to be removably fastened to carpet on the surface of a target boat deck. In other embodiments, corresponding loop component sections of hook and loop fastener material can be adhered to the target surface of a boat deck to enable the cushion layer 10 to be removably fastened at that point.

Referring now to FIGS. 1, 2, 3, and 4, in the preferred embodiment, the marine vessel floor mat includes the cushion layer 10 with a non-slip layer 20 permanently attached to its top surface. The non-slip layer 20 defines a base section 21 of conventional marine carpet and in shaped as the cushion layer 10, with an additional front section 22, and/or with an additional rear section 23. The front section 22 and the rear section 23 may be employed together or in the alternative to one another as an addition to the base section 21 to provide material that can attach inside deck boxes to provide additional stability.

The non-slip layer 20 additionally includes a pedal seat non-slip aperture 24 oriented thereon such that it aligns with the pedal seat cushion aperture 12 when the non-slip layer 20 is in place on the cushion layer 10, thereby enabling the placement of a conventional pedal seat pole (not shown) or other support structure through the body of the cushion layer 10 and the non-slip layer 20 to the surface on which it is placed.

It is contemplated that in alternate embodiments, the cushion layer 20 may be used without the non-slip layer 20.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A marine vessel floor mat for attachment to a deck of a target vessel, comprising:
    a cushion layer having a top surface, a bottom surface and a perimeter with an arcuate segment, wherein said cushion layer includes a pair of fastener portions which are positioned in mirror image locations on its bottom surface, with each of the fastener portions positioned adjacent to and contouring around a portion of the arcuate segment of the perimeter;
    a non-slip layer permanently attached to the top surface of the cushion layer, wherein said non-slip layer defines at least a base section that is sized to cover the entire top surface of the cushion layer; and
    wherein a tapered edge extends around the entire perimeter of the cushion layer and the entire cushion layer except the tapered edge measures $3/8$ inch thick.

2. The marine vessel floor mat of claim 1, wherein said fastener portions each define a strip of hook material of a hook and loop fastener.

3. The marine vessel floor mat of claim 1, wherein the cushion layer includes a pedal seat cushion aperture and the non-slip layer includes a pedal seat non-slip aperture that are aligned together to adapt the marine vessel floor mat to allow a single pole to pass through both the cushion layer and non-slip layer.

4. The marine vessel floor mat of claim 1, wherein said non-slip layer includes a front section that extends beyond the top surface of the cushion layer.

5. The marine vessel floor mat of claim 4, wherein said non-slip layer includes a rear section that extends beyond the top surface of the cushion layer.

6. The marine vessel floor mat of claim 1, wherein said non-slip layer includes a rear section that extends beyond the top surface of the cushion layer.

* * * * *